(12) United States Patent
Radl

(10) Patent No.: US 7,405,759 B2
(45) Date of Patent: Jul. 29, 2008

(54) IMAGING WITH SPECTRALLY DISPERSIVE ELEMENT FOR ALIASING REDUCING

(75) Inventor: Bruce M. Radl, Stow, MA (US)

(73) Assignee: Mosaic Imaging, Inc., Stow, MA (US)

( * ) Notice: Subject to any disclaimer, the term of this patent is extended or adjusted under 35 U.S.C. 154(b) by 1014 days.

(21) Appl. No.: 09/966,484

(22) Filed: Sep. 28, 2001

(65) Prior Publication Data

US 2003/0063205 A1   Apr. 3, 2003

(51) Int. Cl.
*H04N 3/14* (2006.01)
*H04N 9/07* (2006.01)

(52) U.S. Cl. ........................... 348/336; 348/272

(58) Field of Classification Search ............... 348/276, 348/275, 335, 336, 337, 338, 339, 340
See application file for complete search history.

(56) References Cited

U.S. PATENT DOCUMENTS

| | | | | | |
|---|---|---|---|---|---|
| 4,626,897 | A | * | 12/1986 | Sato et al. | 348/273 |
| 4,654,698 | A | * | 3/1987 | Langworthy | 348/238 |
| 4,882,619 | A | * | 11/1989 | Hasegawa et al. | 348/337 |
| 5,682,265 | A | * | 10/1997 | Farn et al. | 359/571 |
| 6,040,857 | A | | 3/2000 | Hirsh et al. | |

FOREIGN PATENT DOCUMENTS

| | | |
|---|---|---|
| JP | SHO63-24523 | 2/1988 |
| JP | SHO63-26520 | 2/1989 |

* cited by examiner

*Primary Examiner*—Thai Tran
*Assistant Examiner*—Timothy J. Henn
(74) *Attorney, Agent, or Firm*—Fish & Richardson P.C.

(57) ABSTRACT

Electro-optical apparatus includes lens apparatus, a CCD having a predetermined filter pattern and a spectrally dispersive element interposed between the lens apparatus and the CCD.

2 Claims, 3 Drawing Sheets

BAYER FILTER PATTERN ON CCD.

SPECTRALLY DISPERSING A SINGLE WHITE IMAGE POINT USING AN OPTICAL ELEMENT.

A SINGLE WHITE POINT IS IMAGED AS A LINE WITH ITS RED END CENTERED ON THE RED PIXEL AND ITS BLUE END CENTERED ON THE BLUE PIXEL.

SPECTRAL DISPERSION PROPERTY OF A PLANE
NON-PARALLEL PLATE OR "OPTICAL WEDGE".

EFFECTIVE LOCATION AND COLOR OF RECORDED PIXELS
USING DISPERSIVE ELEMENT AND BAYER PATTERN CCD.

OPTIMUM TRI-STRIPE FILTER PATTERN.

EFFECTIVE LOCATION AND COLOR OF RECORDED PIXELS USING DISPERSIVE ELEMENT AND OPTIMUM PATTERN CCD. INCLUDES OPTICAL IMAGE SMEAR EFFECT IN DIRECTION OF DISPERSION.

IMAGING WITH SPECTRALLY DISPERSIVE ELEMENT FOR ALIASING REDUCING

The present invention relates in general to aliasing reducing and more particularly concerns aliasing reducing in an electronic image pickup apparatus.

BACKGROUND OF THE INVENTION

An electronic image pickup apparatus, for example, a television camera, typically comprises solid-state image pickup devices, such as charge coupled device (CCD) image sensors and an imaging optical system which functions to form images of an object on light receiving surfaces of these image pickup devices. The image pickup devices of this type typically comprise a large number of picture elements which are disposed in lattice patterns and configured so as to spatially sample, at discontinuously distributed picture elements, the images of the object formed on the light receiving surfaces of the image pickup devices. These image pickup devices function to convert the sampled light intensities into corresponding video electrical signals that may be transmitted to a display unit, such as a monitor television set, that reproduces the images represented by the video signal.

When the images of the object contain components which have spatial frequencies exceeding a Nyquist frequency limit for the image pickup devices, the image pickup apparatus equipped with the image pickup devices for spatially sampling the images of the object allows spurious signals, such as moiré or aliasing to be produced, thereby remarkably degrading quality of the images which are reproduced on the display unit. For this reason, a typical imaging optical system used in the image pickup apparatus of this type is configured so as to exhibit an effect to limit spatial frequency response so that components having frequencies in the vicinity of the Nyquist frequency limit are eliminated from spatial frequency components contained in the images of the object (optical low pass effect). The optical low pass effect is obtained, for example, by forming dualized images with a quartz filter disposed in the imaging optical system or blurring the images of the object with a phase filter.

Japanese Utility Model Kokai Publication No. SHO63-24,523 discloses a method to form dualized images by disposing a wedge-shaped prism in the imaging optical system so that a portion of a light bundle passes through this prism to obtain the optical low pass effect. Japanese Patent Kokai Publication No. SHO47-38,001 discloses a method to form ring-shaped blurred images with a conical prism disposed in the imaging optical system. Japanese Patent Kokai Publication No. SHO63-6,520 discloses a method to blur the images by producing spherical aberration of higher orders in the imaging optical system.

SUMMARY OF THE INVENTION

According to the invention, there is a lens for focusing an image of the object upon a photoelectric array with a spectrally dispersive element between the lens and array. According to another aspect, red and blue digital images are optically shifted to coincide geometrically. The point of coincidence is typically approximately midway between two green pixels with which they share borders. A new green pixel is created by averaging the two green pixels adjacent to the original red and blue pixels to establish the red, green and blue color information centered near to the corner where all four original pixels meet.

Typically there is lens apparatus, a CCD image sensor having a predetermined filter pattern of color-sensitive pixels and a spectrally dispersive element between the lens apparatus and the CCD image sensor. In one aspect, the filter pattern is a Bayer filter pattern. In another aspect, the filter pattern is a tri-stripe pattern. The color-sensitive pixels are typically arranged in contiguous groups with each group having at least a red pixel and a blue pixel and the lens apparatus and spectrally dispersive element coact to focus a line image of an optical point upon a line of a group with the red end of the line within the red pixel of a group and the blue end of the line within the blue pixel of the group.

It is an important object of the invention to reduce moiré or frequency aliasing.

Other features, objects and advantages of the invention will become apparent from the following detailed description when read in connection with the accompanying drawing in which:

DETAILED DESCRIPTION

Figure 1:
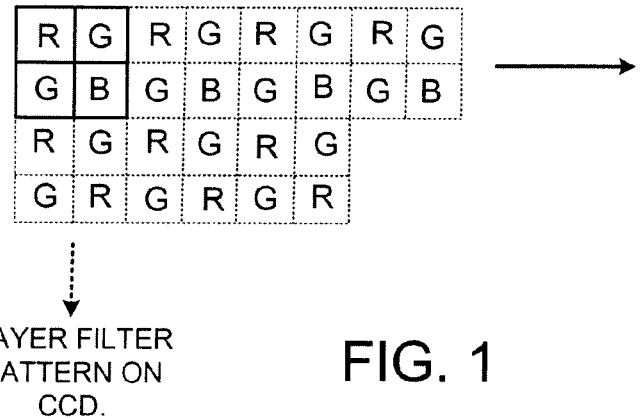
FIG. 1 illustrates a Bayer Filter Pattern on CCD.

With reference now to the drawing, and more particularly FIG. 1, there is shown a Bayer filter pattern on a CCD with each square having two diagonally opposed green G elements and diagonally opposed red R and B elements.

Figure 2:
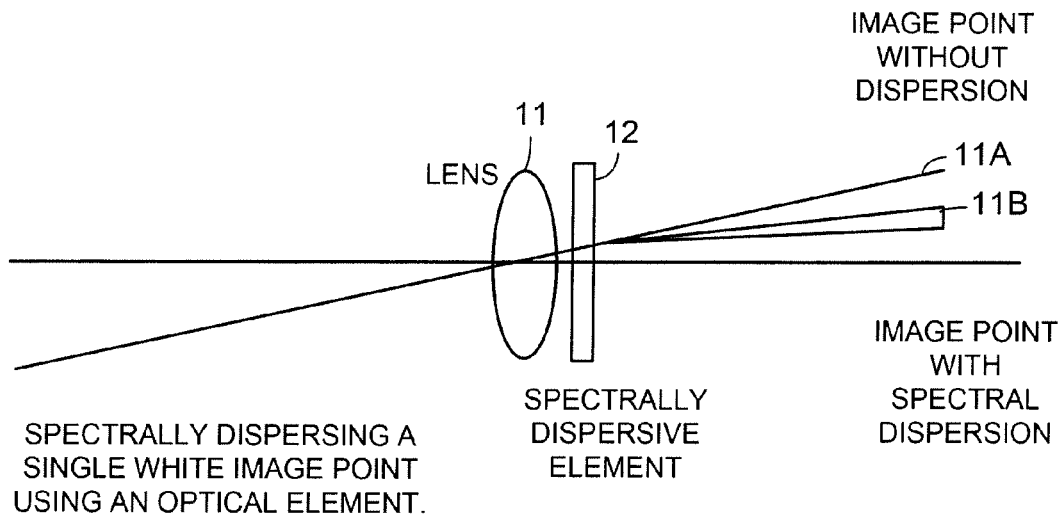
FIG. 2 is a diagrammatic representation of a system for spectrally dispersing a single white image point using an optical element.

Referring to FIG. 2, there is shown a pictorial representation of spectrally dispersing a single white image point using an optical element. A lens 11 focuses an image of an object point upon image point 11A in the absence of spectrally dispersive element 12. In the presence of spectrally dispersive element 12, the image point is focused to a line segment 11B with lower frequency light (red) at one end and higher frequency light (blue) at the other end.

Figure 3:
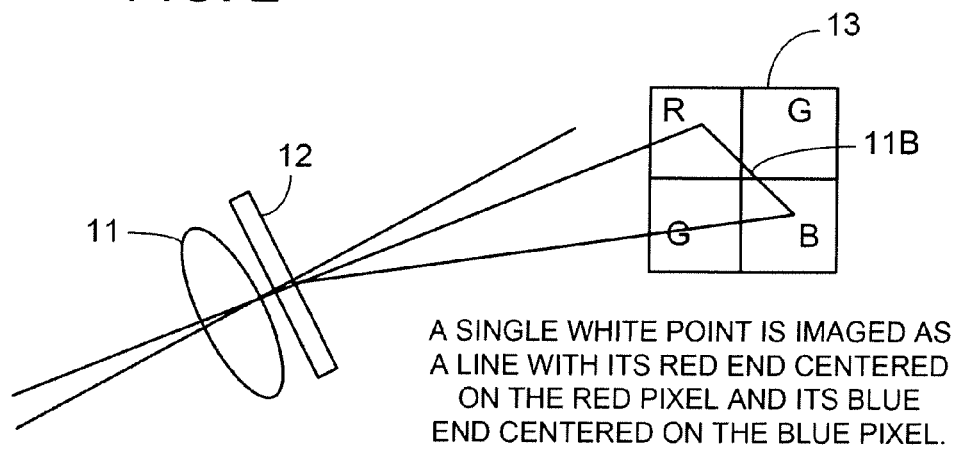
FIG. 3 is a pictorial representation of imaging a single white point as a line with its red end centered on the red pixel and its blue end centered on the blue pixel.

Referring to FIG. 3, there is shown how lens 11 and spectrally dispersive element 12 coact to focus image 11B on square 13 of a Bayer filter pattern on CCD with its red end within the red pixel R and its blue end within the blue pixel B.

Figure 4:
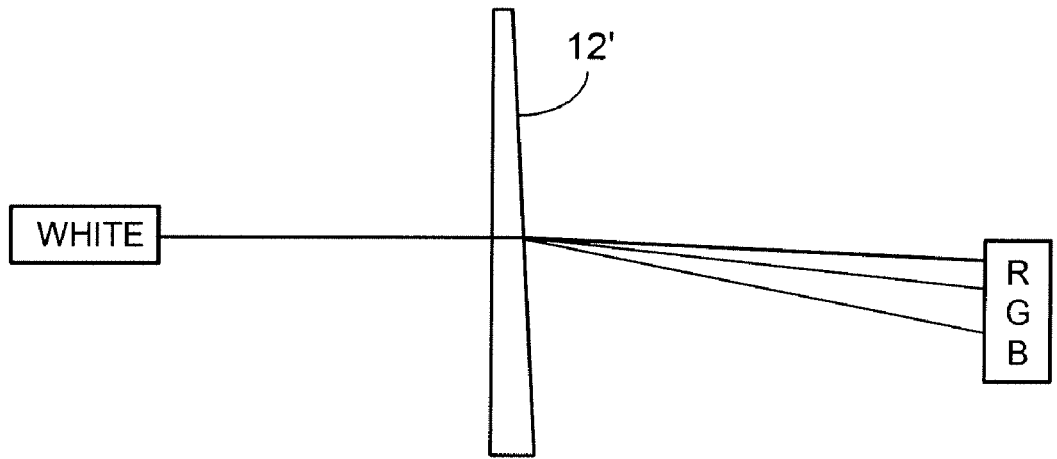
FIG. 4 is a pictorial representation illustrating the spectral dispersion property of a plane, nonparallel plate or optical wedge.

Referring to FIG. 4, there is shown the spectral dispersion property of a plane nonparallel plate or optical wedge 12'— that may comprise spectrally dispersive element 12 and disperses white light indicated at the left into a spectrum including a red end at R, a blue end at B and a green portion intermediate at G.

Figure 5:
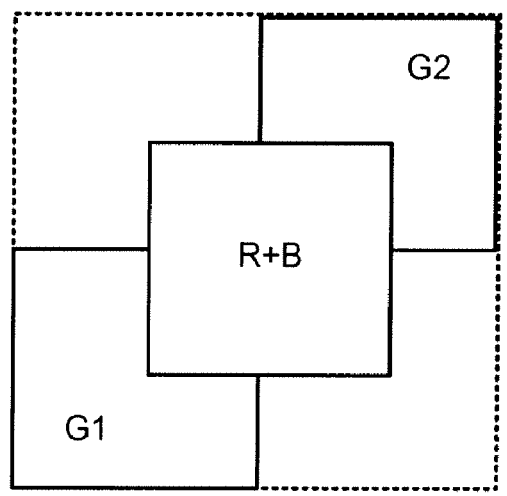
FIG. 5 illustrates the effective location and color of recorded pixels using the dispersive element and a Bayer pattern CCD.

Referring to FIG. 5, there is shown the effective location and color of recorded pixels using the dispersive element 12 and Bayer pattern CCD with red plus blue R+B in the center partially overlapping green pixels G1 and G2.

Figure 6:
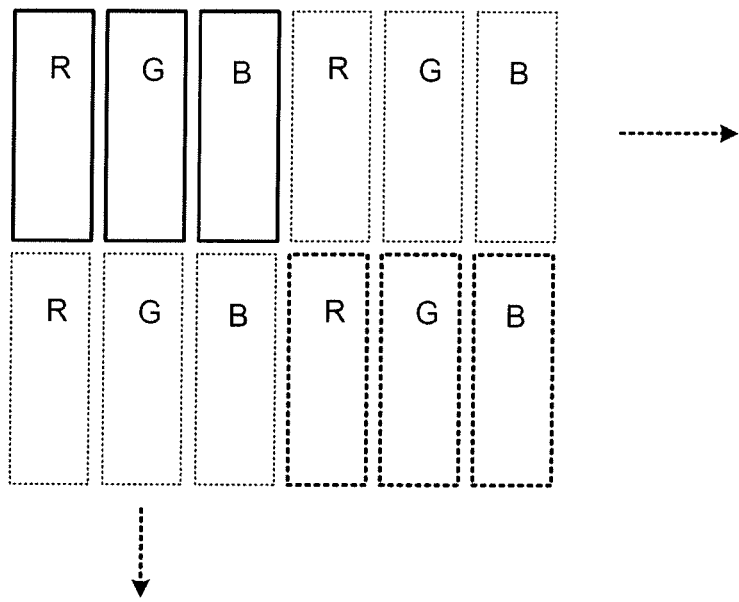
FIG. 6 illustrates an optimum tristripe filter pattern.

Referring to FIG. 6, there is shown the optimum tri-stripe filter pattern showing rows of red R, green G and blue B stripes.

Figure 7:
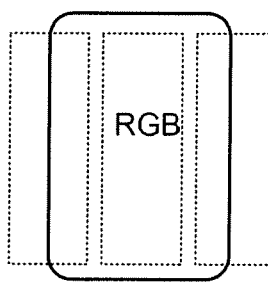
FIG. 7 illustrates the effective location and color of recorded pixels using a dispersive element and optimum pattern CCD filter which includes optical image smear effect in the direction of dispersion.

Referring to FIG. 7, there is shown the effective location and color of recorded pixels using dispersive element 12 and optimum tri-stripe filter pattern CCD of FIG. 6 that includes optical image smear effect in the direction of dispersion. This smear is the result of the impulse response of the lens.

There has been described novel apparatus and techniques for reducing aliasing and moiré effects. It is evident that those skilled in the art may now make numerous uses and modifications of the specific apparatus and techniques described herein without departing from the inventive concepts. Consequently, the invention is to be construed as embracing each and every novel feature and novel combination of features present in, or possessed by, the apparatus and techniques herein disclosed and limited only by the spirit and scope of the appended claims.

What is claimed is:

1. Electro-optical apparatus comprising, lens apparatus, a CCD image sensor having a predetermined filter pattern of color-sensitive pixels, a spectrally dispersive element between said lens apparatus and said CCD, wherein said filter pattern is a Bayer filter pattern, wherein color-sensitive pixels are arranged in contiguous groups with each group having at least a red pixel and a blue pixel and said spectrally dispersive element and said lens apparatus are constructed and arranged to focus a line image of an optical point upon a line of a group with the red end of the line within the red pixel of a group and the blue end of the line within the blue pixel of the group.

2. Electro-optical apparatus comprising, lens apparatus, a CCD image sensor having a predetermined filter pattern of color-sensitive pixels, and a spectrally dispersive element between said lens apparatus and said CCD wherein said color-sensitive pixels are arranged in groups with each group having a red pixel, a blue pixel and first and second green pixels that meet in a corner and said lens apparatus and said spectrally dispersive element are constructed and arranged to effectively create a new green pixel by averaging the first and second green pixels to establish red, green and blue color information centered on said point located substantially where said red, blue and first and second green pixels meet.

* * * * *

UNITED STATES PATENT AND TRADEMARK OFFICE
CERTIFICATE OF CORRECTION

PATENT NO. : 7,405,759 B2  
APPLICATION NO. : 09/966484  
DATED : July 29, 2008  
INVENTOR(S) : Bruce M. Radl Page 1 of 1

It is certified that error appears in the above-identified patent and that said Letters Patent is hereby corrected as shown below:

On the title page, item [73]:
Delete "Assignee: Mosaic Imaging, Inc., Stow, MA (US)"

Signed and Sealed this

Eleventh Day of August, 2009

David J. Kappos
*Director of the United States Patent and Trademark Office*